United States Patent [19]
Brown

[11] 3,782,805
[45] Jan. 1, 1974

[54] FRONT PROJECTION SCREEN MADE FROM A TRANSPARENT MATERIAL

[75] Inventor: John Brown, New Hope, Pa.
[73] Assignee: Qantix Corporation, Flemington, N.J.
[22] Filed: Nov. 30, 1972
[21] Appl. No.: 310,882

[52] U.S. Cl.................. 350/129, 350/128, 350/167
[51] Int. Cl. ......................................... G03b 21/60
[58] Field of Search.................. 350/128, 167, 106, 350/109, 127, 129

[56] References Cited
UNITED STATES PATENTS

| | | | |
|---|---|---|---|
| 2,991,693 | 7/1961 | MacNeille | 350/128 |
| 2,175,067 | 10/1939 | Rolph | 350/106 X |
| 595,273 | 12/1897 | Soper | 350/167 |
| 2,180,093 | 11/1939 | Personis | 350/106 |
| 2,351,034 | 6/1944 | Gabor | 350/128 X |
| 2,551,954 | 5/1951 | Lehman | 350/167 |

Primary Examiner—Samuel S. Matthews
Assistant Examiner—E. M. Bero
Attorney—Lawrence I. Lerner et al.

[57] ABSTRACT

A front projection screen is disclosed which is made from a transparent material. Prism like elements are formed on the back side thereof so that light incident upon the screen from a preferred direction will be totally reflected by the screen while light incident upon the screen from other directions will pass therethrough. Sides of the prism like elements are curved to provide dispersion in the horizontal plane while the front surface of the projection screen has segments of cylindrical columns formed thereon perpendicular to the prism like elements to provide an angular spread in the vertical plane.

5 Claims, 3 Drawing Figures

PATENTED JAN 1 1974  3,782,805
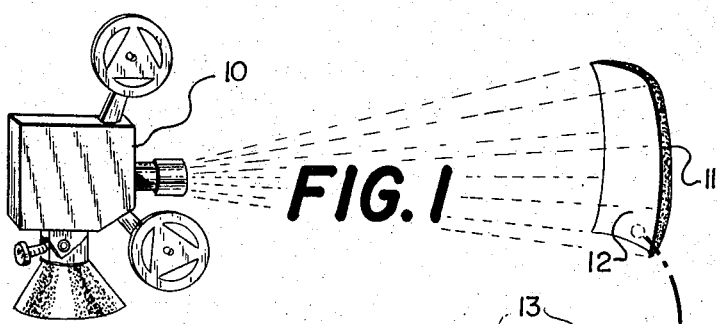
FIG.1
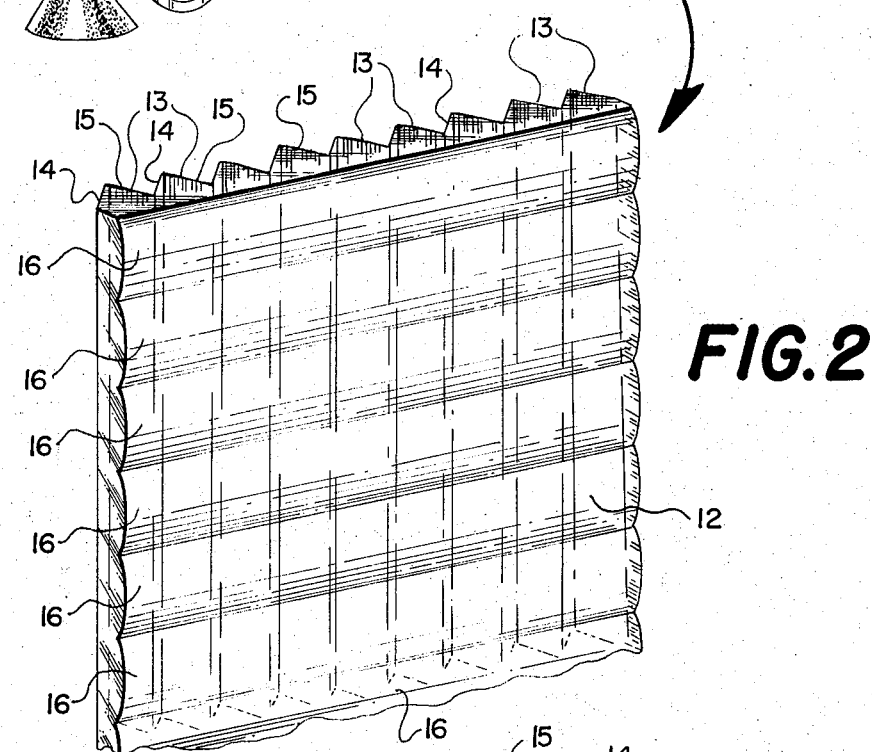
FIG.2
FIG.3

FRONT PROJECTION SCREEN MADE FROM A TRANSPARENT MATERIAL

FIELD OF THE INVENTION

This invention relates to projection screens and particularly front projection screens.

BACKGROUND OF THE INVENTION

Projection screens are well known in the art which are employed for picture display. Most screens as they are traditionally known have a material on the surface thereof for the purpose of dispersing light in a multitude of directions which is incident upon the screen from the projector.

In situations where the efficiency of the screen is important, attempts have been made to direct light incident upon the screen from the projector into a predetermined viewing area. For example in my prior patent, Ser. No. 178,990 which was filed on Sept. 9, 1971 and is entitled "Lenticular Projection Screen" now U.S. Pat. No. 3712708, a lenticular projection screen is disclosed which consists of a plurality of overlapping spherical concave lenses formed in reflective material. The lenses and the screen are constructed so that the projected light rays are reflected to predetermined viewing areas in front of the screen.

When screens are made of a reflective material it is of course obvious that reflections from sources other than the projector become a problem. In the past people have overcome this problem by using the screen in a dark room. Attempts have been made to use such screens in lighted areas by putting light absorbing elements in predetermined locations with respect to the reflective material in the screen. These attempts have been somewhat succesful but have added additional annoyance to the use of the screen and/or additional cost and encumberance in the manufacture and use of the screen. Notwithstanding these efforts to overcome the problems of unwanted reflections, difficulties are still encountered when using these screens.

Even in a dark movie theater, people open the door to come in and go out and ushers use flashlights which create difficulty with reflections therefrom. The use of light absorbing material while having a limited beneficial affect still does not completely overcome the problem of unwanted reflections.

On Dec. 14, 1926, U.S. Pat. No. 1,610,423 issued to A. J. Cawley which was entitled "Daylight Projecting System." In FIG. 4 of this patent a daylight projection screen is disclosed in which a transparent material is shaped to have prism like ridges on the back thereof for the purpose of reflecting light which is incident thereon from a predetermined angle. Cawley teaches that the critical angle of the material should be as close to 45° as possible and that the angle of the sides of the prism like portions should be inclined with respect to the plane of the material at 45°. The reason for this is to insure that only light incident upon the screen from a single direction will be reflected back towards the audience. All other light incident upon the screen will strike one side of the prism or the other at an angle less than 45° with respect to a normal to the surface thereof and pass therethrough rather than be reflected.

The Cawley system is an interesting curiosity but is of no practical significance since all of the light is focused back in a single direction so that the audience must be located directly in front of the screen. If the screen is moved by an angle of say 1 degree with respect to the incoming projected light, the image reflected back to the audience will be lost because the largest portion of the light incident upon the screen from the projector will pass therethrough rather than being reflected back. Further if the audience is not sitting at the precise angular relationship with respect to the screen, they will again see very little because the screen of Cawley will project light back parallel to the rays incident thereof and provide no dispersive angular affect of reflection.

Therefore, it is an object of this invention to provide a new and improved front projection screen.

It is a further object of this invention to provide a front projection screen which efficiently uses the light provided by the projector, does not reflect undesirable images to the audience and is viewable from positions other than directly in front of the screen.

It is still another object of this invention to provide a front projection screen which may be employed in daylight with a minimum of reflection without the use of light absorbing members affixed thereto.

BRIEF DESCRIPTION OF THE INVENTION

With these and other objects in view the present invention contemplates a front projection screen made from a sheet of light transmitting material having a predetermined critical angle of internal reflection less than 45°; the sheet has a front surface and a back surface; the back surface having formed thereon a plurality of parallel ridges; each of the ridges have curved sides terminating at a peak; the curved sides extend away from the sheet at an angle equal to or greater than 45°; the angle of the sides with respect to the sheet continuously decrease as the curved sides extend towards the peak; the angle of the sides being greater than or equal to the predetermined critical angle of internal reflection at the peak but less than 45°.

In the preferred embodiment of the invention the front surface has formed thereon a plurality of parallel ridges each forming a section of a cylinder. The ridges on the front surface are disposed perpendicularly to the ridges on the back surface for the purpose of giving dispersion of the light in the vertical plane. In the preferred embodiment there are at least 500 ridges on the back surface of the screen to provide sufficient resolution to project a normal television picture thereon without degrading the image thereof.

Further, in the preferred embodiment the thickness of the screen is made greater than the focal length of the cylindrical sections on the front thereof but less than one and one half times the focal length to provide a structure which not only performs the desired function but is mechanically able to be relatively self-supporting.

DESCRIPTION OF THE DRAWINGS

For a more complete understanding of the invention, reference should be made to the following detailed description and drawings in which:

FIG. 1 is a schematic prospective view of a front projection system employing a screen constructed in accordance with the teachings of this invention;

FIG. 2 is a front prospective view of a section of the screen shown in FIG. 1; and FIG. 3 is a back prospective view of the screen shown in FIG. 1.

DETAILED DESCRIPTION OF THE INVENTION

Referring now to FIG. 1 we see a front projection system employing a screen constructed in accordance with the teachings of this invention. A projector 10 is mounted a fixed distance from a screen 11 which is formed as a section of a sphere having a radius of curvature equal to the distance between the screen 11 and the projector 10. It is of course understood that as the distance between the projector 10 and the screen 11 becomes greater, the need for the precise curvature of the screen 11 becomes less important so that as the distance becomes substantial the screen 11 may in fact be flat. The reason for the curvature of the screen 11 is to insure that the rays of light emanating from the projector 10 incident upon the screen 11 strikes a front surface of the screen 12 normal thereto at each point thereof.

Referring now to FIG. 2 we see the details of a small section of the screen 11. It should be understood that the screen is uniform throughout so that the section shown in FIG. 2 is representative of the makeup of screen 11.

The screen 11 is made from a transparent material which has a critical angle of internal reflection less than 45 degrees. A critical angle of internal reflection is defined as the angle at which light must strike a surface of a material when passing from the inside to the outside thereof to a second predetermined medium so as to be totally reflected rather than passing to the second medium. The angle of incidence as referred to above is measured between the ray of light and a line normal to the surface of interest at the point of incidence. The critical angle of internal reflection is the angle which defines the limit of total reflection so that any incident light beam which has an angle of incidence greater than the critical angle will be totally reflected.

As can be seen when looking at FIGS. 2 and 3 the back surface of the screen 11 has a plurality of ridges thereon which form prism like elements. The ridges 13 are parallel to each other and have curved sides 14 and 15. Each of the curved sides 14 and 15 meet at a peak thereof which appears in FIG. 3 as a line.

The angle of the sides 14 and 15 with respect to a plane extending through the screen 11 at the point of interest is equal to or greater than 45°. As the sides 14 and 15 extend away from the screen 11 towards the intersection thereof, the angle with respect to the aforementioned plane decreases until the intersection is reached. At the intersection or peak, the angle of the side 14 and/or 15 with respect to the aforementioned plane is less than 45° but greater than or equal to the critical angle of internal reflection of the material forming the screen 11. The curvature of the sides 14 and 15 as above described is the key to the functioning of the instant screen. In the first place, without regard to any other considerations, the curvature of the sides 14 and 15 allow a certain amount of leeway in the angular relationship between the projector 10 and the mounting of the screen 11. As will be appreciated if a predetermined angle were necessary with a tolerance of 1° or less, the slightest movement of the projector 10 or the screen 11 would render the system less functionable and therefore would detract from it as a commercial item. By curving the sides of the screen 14 and 15 by, for example 6° to 10°, a considerably greater range of angular tolerance is built in without greatly adding to the directions from which ambient light can be reflected back to the audience.

Further advantages accrue from the curvature of the sides 14 and 15 which render the screen 11 of the instant invention a commercially usable item. By curving the sides, the direction in which light incident upon the screen 11 is transmitted back towards the audience is determined by the portion of the side 14 or 15 upon which it strikes. Therefore if the sides 14 and 15 were straight, all of the light incident thereon would either be reflected directly back towards the projector or if at an improper angle of incidence would pass therethrough. Under the teaching of the instant invention, the light incident upon the screen 11 at a predetermined angle will be reflected back towards the audience at a plurality or range of angles which can be controlled by the degree of curvature of the sides 14 and 15 to provide a predetermined viewing area greater than merely directly in front of the screen. While this curvature does increase the directions from which light will be reflected back, the small angular range of viewing areas necessary for display purposes renders the compromise a practical commercial one.

A light ray emanating from the projector 10 and striking the screen 11 so as to hit the surface 14 or 15 close to a trough will be hitting a surface of approximately 45°. Such a light ray will be totally reflected and passed across to an opposite side thereof and is reflected back toward the projector parallel to the incident light ray. It should be noted at this point that a reversal or inversion takes place in small segments of the picture as the light rays pass through the prism like ridges 13.

It will be appreciated that as the position of incidence of a light ray varies along a side 14 or 15 of a ridge 13, the angle at which the light ray will strike the back surface of the screen 11 will be altered since all incident light rays are parallel to each other. Therefore as the position moves from the 45° at the troughs of the ridges 13 towards the lessening angles at the peaks thereof, the direction in which the light ray is reflected back towards the audience is varied. It will be appreciated that since there are two reflections and each time a reflection occurs, the angle of deviation from 45° is multiplied by two in terms of direction of reflection, a six degree curvature in the sides 14 and 15 of the ridges 13 will result in a dispersion of 24° on each side of the normal to the screen. It will of course be appreciated that additional dispersion occurs due to refraction as the light ray passes back out the front face of the screen 11 so that the small curvature at the back thereof provides a substantial degree of dispersion of the projected light. In contradistinction to this if in fact the sides were straight, not only would the dispersion caused by the curvature of the sides 14 and 15 not occur, but no refraction would occur since the light entering the front face of the screen 11 normal thereto would exit normal thereto and be undisturbed.

At this point it is important to understand that the curvature must begin at an angle of 45° or greater since no light would be reflected back towards the audience if there were not a 45° angle. Therefore, the 45° angle provides the beginning point of total reflection. An angle of greater than 45° will not reflect at all in the present configuration since one of the sides 14 or 15 would allow the light ray to pass completely therethrough or would reflect the ray elsewhere. It is thought that it is better to allow a small amount of light to be lost rather than have a dead spot in the center of an audience. In the preferred embodiment, the critical angle of the material making up the screen 11 is less than 45° by an amount equal to the degree of curvature desired in the sides 14 and 15. Thus if a 6° curvature were desired, a material having a critical angle of 39° would be employed so that the sides 14 and 15 would vary in angle of curvature from slightly greater than 45° to cover the center portion of the audience to 39° at the peak. As a result of such an arrangement, all of the projected light incident upon the screen would be reflected back towards the desired portions of an audience array while the maximum angle of directions from which ambient incident light would be reflected is minimized.

Several materials exist which have critical angles in internal reflection with respect to air with approximately 39°. For example, polystyrene has a critical angle under such circumstances of 38.93° while poly (N-2,phenethyl) methacrylamide has a critical angle of 39.01 and poly (o-tolyl) methacrylate has a critical angle of 39.54. Listed below are additional materials which are suitable for use as the material making up the screen 11 with their critical angle with respect to air at 20° to 25° centigrade listed adjacent thereto:

| MATERIAL | CRITICAL ANGLE |
|---|---|
| polymethylacrylate | 42.53 |
| polyethylacrylate | 42.92 |
| polytutylacrylate | 43.01 |
| polyethoxyethylacrylate | 42.83 |
| poly (2 methoxyethyl) acrylate | 43.12 |
| poly (2 bromo sec. butyl) acrylate | 40.43 |
| poly (2 bromo phenyl) acrylate | 38.34 |
| poly (2 chloromethyl) acrylate | 41.23 |
| polyacrylonitrile | 41.47 |
| polymethylmethacrylate | 42.16 |
| polyethylmethacrylate | 42.33 |
| poly butyl methacrylate | 42.4 |
| poly (t-butyl) methacrylate | 43.09 |
| polycyclohexyl methacrylate | 41.59 |
| poly (2-hydroxyethyl) methacrylate | 41.41 |
| poly (2-phenoxyethyl) methacrylate | 39.96 |
| poly phenylmethacrylate | 34.82 |
| poly (o-chloro) styrene | 38.4 |
| poly (2,6 dichloro) styrene | 37.99 |
| poly (0-methoxy) styrene | 38.87 |
| polyacetal | 41.47 |
| poly (n-benzyl) methacrylamide | 38.78 |
| poly (N-butyl) methacrylamide | 41.36 |
| polyvinyl chloride | 40.53 |
| polyvinyl fluoride | 38.68 |
| polyvinylidene chloride | 38.68 |
| polyvinyl acetate | 42.97 |
| polyvinyl carbazole | 36.36 |
| polyvinyl isobutyl ether | 43.58 |
| polyvinyl alcohol | 41.81 |
| poly (n-vinyl) phthalimide | 38.13 |
| polyallyl phthalate | 41.21 |
| polyester-Styrene | 40.5 |
| poly carbonates (bisphenol) | 39.12 |
| zinc crown glass | 41.24 |
| higher dispersion crown glass | 41.14 |
| light flint glass | 39.41 |
| heavy flint glass | 37.31 |
| heaviest flint glass | 31.94 |

Looking at the front surface of the screen 12, it will be noted that a plurality of ridges 16 are formed thereon which are disposed perpendicularly to the ridges 13 formed on the back surface of the screen. It will be noted that the ridges 16 are formed from arcuate portions of cylinders. In this particular instance, each ridge 16 forms the surface of 30° of a cylinder. These ridges 16 act as optical elements for operating on the incoming light from the projector 10 for purposes of creating dispersion of the light to a predetermined range of areas in front of the screen 11 in the vertical field.

It should be appreciated that the ridges 16 operate in conjunction with the reflecting surfaces 14 and 15 to provide the dispersion in the vertical plane. Therefore, the position of the surfaces 14 and 15 with respect to the ridges 16 (the thickness of the screen 11) determines the degree of dispersion produced by the ridges 16. Therefore if the back surface of the screen 11 made up of the surfaces 14 and 15 were considered flat and positioned at the focal point of each of the ridges 15, there would be no vertical dispersion of light. Rather, all of the light would be focused to come out parallel to the incident light. By varying the thickness it will be appreciated that a vertical field will be developed as the thickness of the screen is made less than the focal length of the ridges 16. The angle of dispersion and therefore the vertical field of the screen is increased until the thickness approaches zero.

While in some circumstances a compromise can be arranged between maximum dispersion at zero thickness and thickness equal to the focal length, the thickness of the screen will still be such that additional mechanical support would be necessary for the screen 11 in order to support the weight of the screen. It should be noted that any mechanical support cannot touch the screen 11 in its active area since such support will alter the optical characteristics of the screen and therefore effect its functioning.

It has been found that by making the screen 11 thicker than the focal length of the ridges 16, light will exit the front surface of the screen 11 from a different ridge 16 than it entered. It has further been discovered that if the thickness of the screen is just slightly greater than the focal length of the cylinders 16, light will exit the incident ridge 16 parallel to the incident ray and the adjacent ridges 16 at the maximum angle of dispersion so that in effect, three viewing positions will result in the vertical plane. Further, in accordance with this invention it has been discovered that as the thickness of the screen is increased from the focal length of the ridges 16, the spread of vertical dispersion in the incident ridge 16 will also increase from the maximum towards the direction of incident light in the incident ridge 16. It has been found that a preferred thickness exists in which an entire range of vertical dispersion can be covered with a portion thereof emanating from an incident ridge 16 and the remaining portion of the range emanating from an adjacent ridge 16. It should be understood that each ridge 16 serves as an incident ridge for light incident thereon while also serving as adjacent ridges 16 for light reflected from ridges adjacent thereto.

This might seem confusing and might seem to provide resolution problems but it must be remembered that an individual sitting in a particular viewing relationship to the screen 16 will only see light emanating in that direction thereby providing a slight shift in a picture but will not provide resolution problems. Interestingly though it has been found that if the thickness were increased beyond one and one half focal lengths light will spill into a further adjacent ridge 16. Light from a single incident beam would then be exiting from more than one ridge 16 resulting in resolution difficulties.

As can be appreciated the processing of the light by the screen 11 as described above, results in increased intensity of light in predetermined areas in front of the screen by concentrating incident light into the desired position. This is done in a piece-wise manner by breaking up the picture into columns and rows by the ridges 13 and 16 and focusing it back out where appropriate. It can be appreciated, of course, that the size of the ridges 13 and 16 must be close together so as not to create resolution difficulties. As mentioned above, the ridges 13 cause a reversal of a small portion of the picture so that distinct resolution problems would occur if they were sufficiently large. Therefore, the number of ridges 13 and 16 are made large compared with the resolution desired. Therefore, in order to display a picture such as a television picture having a resolution of over 500 lines, it is desirable that over 500 ridges 13 and 16 be provided on a screen for projection thereof.

It should be understood that while this invention has been described with respect to a specific embodiment thereof, numerous others may become obvious to those of ordinary skill in the art in light of this disclosure.

What is claimed is:

1. A front projection screen made from a sheet of light transmitting material having a predetermined critical angle of internal reflection less than 45°; said sheet having a front surface and a back surface; said screen being characterized by:

said back surface having formed thereon a plurality of parallel ridges; each of said ridges having curved sides terminating at a peak; said curved sides extending away from said sheet at an angle equal to or greater than 45° immediately adjacent to said sheet; the angle between a line tangent to said sides and said sheet continuously decreasing as said curved sides extend towards said peak; the angle between a line tangent to said sides and said sheet being greater than or equal to said predetermined critical angle of internal reflection at said peaks but less than 45°.

2. The front projection screen as defined in claim 1 characterized further by:

said front surface having formed thereon a plurality of parallel ridges each forming a section of a cylinder; said ridges on said front surface being disposed perpendicularly to said ridges on said back surface.

3. The front projection screen as defined in claim 2 in which said back surface has a minimum of 500 ridges thereon.

4. The front projection screen as defined in claim 3 in which said front surface has a minimum of 500 ridges thereon.

5. The front projection screen as defined in claim 3 in which the parallel ridges which form sections of cylinders each have therefor a focal length and the distance from said front surface to said back surface is between one and one and one half times said focal length.

* * * * *